(12) United States Patent  (10) Patent No.: US 7,861,997 B2
Brewer, III et al.  (45) Date of Patent: Jan. 4, 2011

(54) RELEASABLE DECK MOUNT FOR SHIPBOARD PRINTERS

(75) Inventors: Charles R Brewer, III, Farmington, NY (US); Thomas C Palumbo, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 86 days.

(21) Appl. No.: 12/353,994

(22) Filed: Jan. 15, 2009

(65) Prior Publication Data

US 2010/0176268 A1  Jul. 15, 2010

(51) Int. Cl.
*F16M 11/00* (2006.01)
(52) U.S. Cl. .................. 248/680; 248/500; 70/57; 70/15
(58) Field of Classification Search ........... 248/637, 248/680, 681, 499, 500, 505; 70/15, 57, 70/58; 24/437
See application file for complete search history.

(56) References Cited

U.S. PATENT DOCUMENTS

| | | | |
|---|---|---|---|
| 4,300,371 A * | 11/1981 | Herwick et al. ............... 70/58 |
| 4,777,809 A * | 10/1988 | Wiggins ..................... 70/57 |
| 5,197,706 A * | 3/1993 | Braithwaite et al. ......... 248/499 |
| 5,560,313 A | 10/1996 | Brewer, III | |
| 5,699,993 A * | 12/1997 | Hill et al. .................. 248/680 |
| 5,890,695 A | 4/1999 | Brewer, III | |
| 5,927,895 A * | 7/1999 | Watanabe ................. 403/353 |
| 5,949,339 A * | 9/1999 | Ettinger et al. ........... 340/573.1 |
| 5,983,573 A * | 11/1999 | MacKarvich ................. 52/23 |
| 6,015,131 A | 1/2000 | Brewer, III | |
| 6,076,380 A * | 6/2000 | Hulak ......................... 70/14 |
| 6,176,056 B1 * | 1/2001 | MacKarvich .............. 52/293.3 |
| 6,282,856 B1 * | 9/2001 | MacKarvich ................ 52/299 |
| 6,533,238 B2 * | 3/2003 | Barnes et al. ............. 248/680 |
| 6,971,623 B2 * | 12/2005 | Allmon et al. ............ 248/680 |
| 2008/0164400 A1 * | 7/2008 | Beechinor .................. 248/500 |

* cited by examiner

*Primary Examiner*—Terrell Mckinnon
*Assistant Examiner*—Bradley H Duckworth

(57) ABSTRACT

A releasable deck mount used to tie printers to the deck of vessels includes a metal plate for welding to the vessel's deck that incorporates a profile of a clip that is connected to a strap and inserted into the deck mount for capture purposes. The plate is very low and minimizes any tripping hazard. A spring plate is attached to the top of the metal plate and a pin is secured to the spring plate and extends through a hole in the metal plate. The pin is designed to be movable and has a chamfer to allow insertion of the strapping clip. The clip is released from the deck mount by lifting the pin to allow the clip to be removed.

18 Claims, 2 Drawing Sheets

RELEASABLE DECK MOUNT FOR SHIPBOARD PRINTERS

BACKGROUND

1. Field of the Disclosure

This disclosure relates to a device for mounting a machine or other apparatus to a ship, and more particularly, to a releasable deck mount for straps on shipboard printers.

2. Description of Related Art

The features of the present disclosure are useful for any machine that is required to be stabilized on a surface, for example, printing machines, such as, electrophotographic printing machines.

In the process of electrostatic printing, a photoconductive or dielectric surface is charged to substantially uniform potential. Conventionally, in such systems, a latent image charge pattern is formed on these uniformly charged photoconductive or dielectric members. This records an electrostatic latent image on the photoconductive surface corresponding to the informational areas contained within an original document. Thereafter, a marking material s, such as, toner particles is transported onto contact with the electrostatic latent image in a region known as the development zone. Toner particles are attracted from a magnetic roller to the latent image. The resultant toner powder image is then transferred from the photoconductive surface to a copy sheet and permanently affixed thereto. The foregoing generally describes a typical mono-color single component development electrophotographic printing machine and each station performs the exacting activity of precise charging, development, fusing, alignment and the like. If any of these stations, even one, is not precisely functioning or is in misregistration due to ship vibration, the entire electrostatic marking system will be adversely affected.

Heretofore, printers have been vibration or shock mounted on ships in multiple ways, for example, as shown in U.S. Pat. Nos. 5,560,313; 5,890,695; and 6,015,131 which are included herein by reference to the extent necessary to practice the present disclosure. However, current U.S. Navy requirements prevent vibration isolation frames from being used to secure webbing and straps around shipboard printers and copiers in "Battle Stations" modes. A separate mounting is now required for the strapping tie downs. Further requirements stipulate that the strapping tie downs can not be a tripping hazard.

BRIEF SUMMARY

Accordingly, disclosed herein is a releasable deck mount for straps tied to shipboard printers. The releasable deck mount includes a metal plate for welding to the ship's deck that incorporates a profile of a clip that is connected to the straps for capture purposes. The plate is very low and minimizes any tripping hazard. A spring plate is attached to the metal plate and a pin is secured to the spring plate. The pin is designed to be movable and has a chamfer to allow insertion of the strapping clip into the metal plate.

Various of the above-mentioned and further features and advantages will be apparent to those skilled in the art from the specific apparatus and its operation or methods described in the example(s) below, and the claims. Thus, they will be better understood from this description of these specific embodiment(s), including the drawing figures (which are approximately to scale) wherein:

BRIEF DESCRIPTION OF THE DRAWINGS

For a general understanding of the features of the present disclosure, reference is made to the drawings. In the drawings, like reference numerals have been used throughout to identify identical elements.

As shown in FIG. 1, and in accordance with the present disclosure, releasable shock mount apparatus 10 comprises a base member 12 that includes a U-shaped slot or cut-out portion 13 in a bottom portion thereof, as well as, relieved areas 19. Base member 12 is preferably welded to deck 40 of a ship (not shown), however, other conventional means of attaching the base member to ship deck 40, such as, bolting could be used, if desired. Base member 12 is preferably made of steel, but could be or any suitable metal or material that would could withstand the necessary shipboard vibration. A releasable locking mechanism comprised of a heavy spring plate 14 is attached to the top of base member 12 and a pin 16 is secured to spring plate 14 by attachment member 18 and adapted to fit into hole 15 within base member 12. Pin 16 has a chamfered surface 17 to facilitate easy insertion of a clip into U-shaped cut-out portion 13 of base member 12. Attachment member 18' is used to mount spring plate 14 onto the top surface of base member 12. Chamfered surface 17 allows for easy insertion of a clip into U-shaped cut-out portion 13 of base member 12. The number of these mounts used per machine will depend on the size and configuration of the machine, such as; high capacity feed units and finishers.

In FIG. 2, a bottom 20 of base member 12 is shown that includes U-shaped cut-out portion 13, relieved areas 19 and pin 16 that includes chamfered surface 17. The U-shaped cut-out portion 13 of base member 12 incorporates a profile for capture of clip 30 shown in FIG. 3 connected to a strap 32. The strapping is secured by means of clip 30 being sewn on the end thereof.

In FIG. 3, clip 30 shown connected to tie-down strap 32 and spaced apart from releasable shock mount apparatus 10. When circumstances require, strap 32 is placed over a piece of machinery that is to be stabilized and clip 30 attached thereto is inserted in the direction of arrow 25 into a releasable shock mount apparatus 10 that is attached to deck 40 of a ship. In FIG. 4, clip 30 is shown completely inserted into releasable shock mount apparatus 10 with the insertion of the clip being facilitated by chamfered surface 17 of pin 16.

Figure 1:
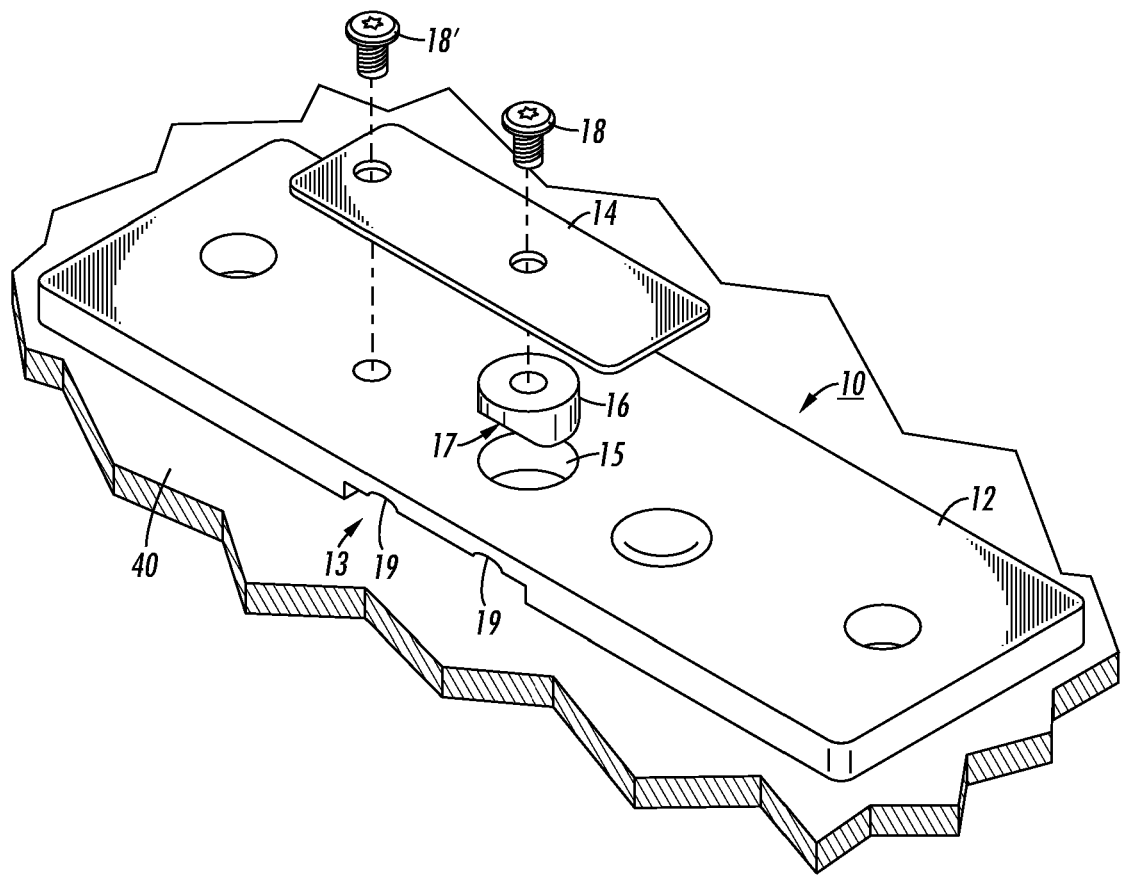
FIG. 1 is an exploded plan view of the deck mount of the present disclosure.
Figure 2:
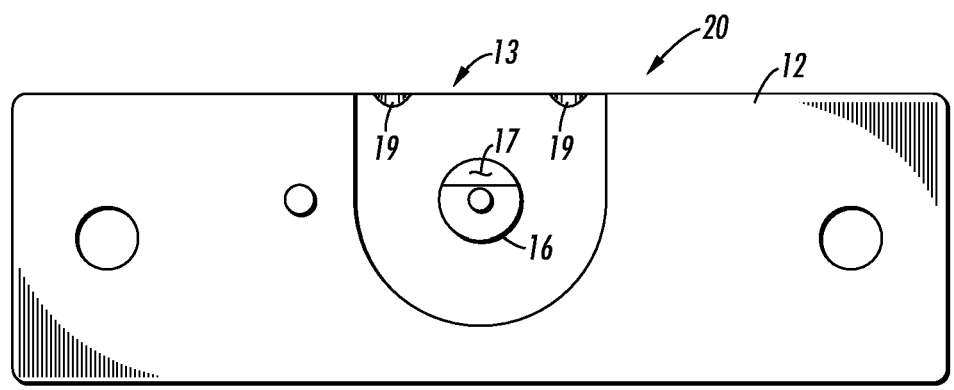
FIG. 2 is a bottom view of the deck mount of FIG. 1.
Figure 3:
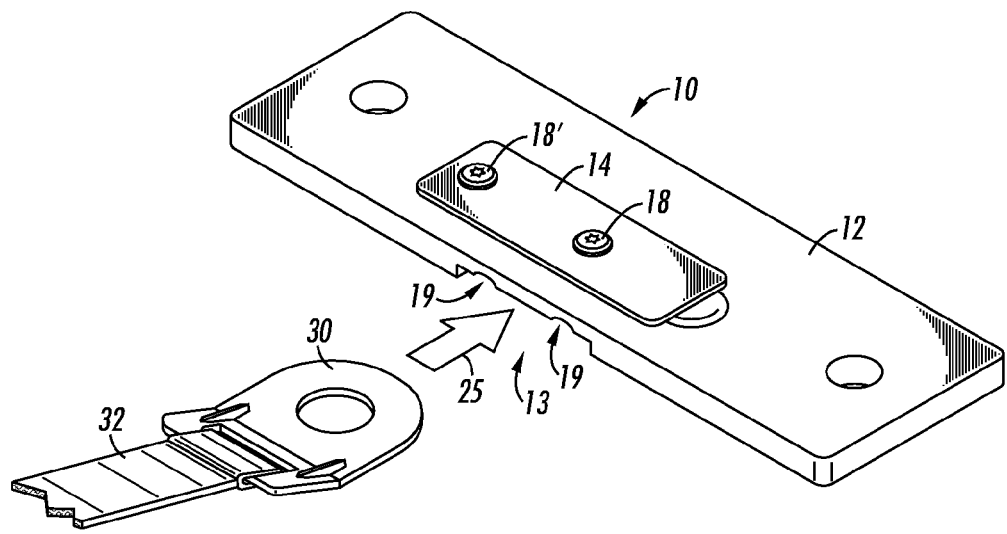
FIG. 3 is a perspective view showing a clip connected to a strap and spaced from the deck mount of FIG. 1.
Figure 4:
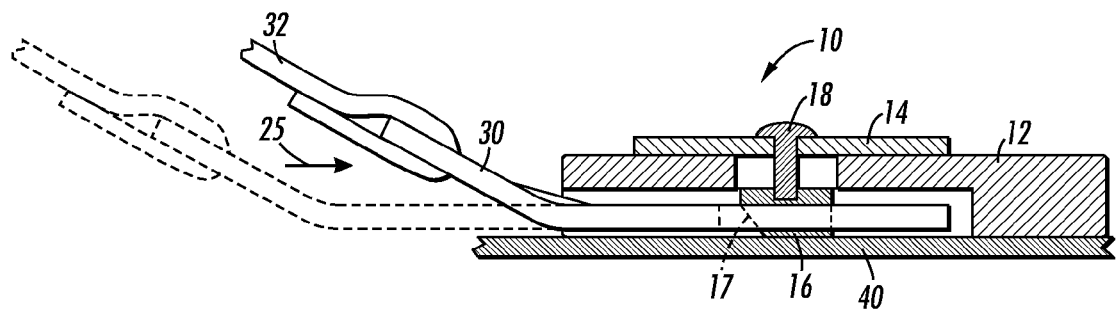
FIG. 4 is a side view showing the clip of FIG. 3 being inserted into the deck mount of FIG. 1.

In operation, with releasable shock mount apparatus 10 welded, or by some other comparable means attached, to the ship deck 40, if the strapping is needed in times of "Battle Stations" modes clip 30 is simply inserted into slot 13 on the side of base member 12 and is automatically captured under the base member since as the clip is inserted past relieved areas 19 into the slot it contacts chamfer surface 17 of spring loaded pin 16 which eases the push lifting of pin 16 so that clip 30 can pass thereunder and lock in place. When need arises to release the clip, a screwdriver or similar tool is used to lift plate 14 and pin 16 from hole 15 of the locking mechanism to release the strapping 32 from the shock mount apparatus.

It can now be readily understood from the foregoing description, that a method and apparatus for shock mounting a machine to a surface or to the deck of a vessel has been disclosed that provides a specialized bracket for securing strapping to the floor or ship deck to assist in securing the machine. The bracket is welded or fastened by other conventional means to the deck and has a spring loaded locking pin to secure the strap. The strap is snapped into place within the specialized bracket and can be easily removed with a simple tool, such as, a screwdriver.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An apparatus for shock mounting a machine to a surface, comprising:
    a base member adapted to be attached to said surface, said base member including a top surface and a bottom surface with a hole through said top and bottom surfaces and a slot in a portion thereof;
    a plate configured for attachment to said top surface of said base member;
    a pin secured to said plate, said pin being positioned within said slot;
    a removable clip, said removable clip including a hole therein and adapted to be attached to said base member by insertion into said slot portion of said base member until said pin fits into said hole in said removable clip, and
    wherein said pin includes a top and bottom portion and a beveled edge in said bottom portion thereof, and wherein said beveled edge facilitates insertion of said removable clip into said slot.

2. The apparatus of claim 1, wherein said slot in said base member is curvilinear.

3. The apparatus of claim 2, wherein said slot is U-Shaped.

4. The apparatus of claim 3, wherein said plate is a spring.

5. The apparatus of claim 4, wherein said plate is made of metal.

6. The apparatus of claim 1, including attachment members for securing said plate to said base member.

7. The apparatus of claim 6, wherein said attachment members are screws.

8. The apparatus of claim 1, wherein said base member includes relieved areas in an entry portion of said slot and positioned on opposite sides of said pin for easing the insertion of said clip into said slot.

9. The apparatus of claim 8, wherein said pin is adapted to fit within said hole in said base member, and wherein said clip includes strapping attached thereto for securing said machine.

10. A releasable deck mount for straps tied to a shipboard reprographic device, comprising:
    a base member having a low profile and adapted to be attached to a surface, said base member including a hole extending through a top portion and bottom portion thereof and a slot in a portion thereof;
    a flexible plate configured for attachment to said top portion of said base member;
    a pin secured to said flexible plate and adapted to fit within said hole and extend a predetermined distance beyond a portion of said bottom portion of said base member; and
    a removable clip having a hole therein and adapted to be attached to said base member by insertion into said slot portion of said base member and contact said pin, such that, insertion of said removable clip into said slot lifts said pin until said hole in said removable clip is reached, with continued insertion of said of said removable clip into said slot portion of said base member causing said pin to snap into said hole in said removable clip to secure said clip within said slot.

11. The apparatus of claim 10, wherein said slot in said base member is curvilinear.

12. The apparatus of claim 11, wherein said slot is U-Shaped.

13. The apparatus of claim 12, wherein said plate is a spring.

14. The apparatus of claim 13, wherein said base member is made of metal.

15. The apparatus of claim 14, wherein said metal is steel.

16. A bracket for use in mounting a machine for making copies of page image information to the deck of a vessel in order to secure the machine against movement when the deck vibrates, comprising:
    a base member having a low profile and adapted to be attached to said deck, said base member including a hole extending through a top portion and bottom portion thereof and a slot in a portion thereof, and wherein said base member includes relieved areas in an entry portion of and adjacent opposite sides of said slot for easing the insertion of a clip into said slot;
    a springable plate configured for attachment to said top portion of said base member; and
    a pin secured to said springable plate and adapted to fit within said hole and extend a predetermined distance beyond a portion of said bottom portion of said base member, said pin being positioned within said slot.

17. The apparatus of claim 16, wherein said slot is positioned within said bottom portion of said base member and is U-Shaped.

18. The apparatus of claim 16, wherein said pin is adapted to fit within said hole in said base member and includes a beveled surface on one end portion thereof.

* * * * *